Sept. 14, 1954    R. J. FOSTER ET AL    2,688,865
HAND OPERATED HYDRAULIC LOCK
Filed April 17, 1951
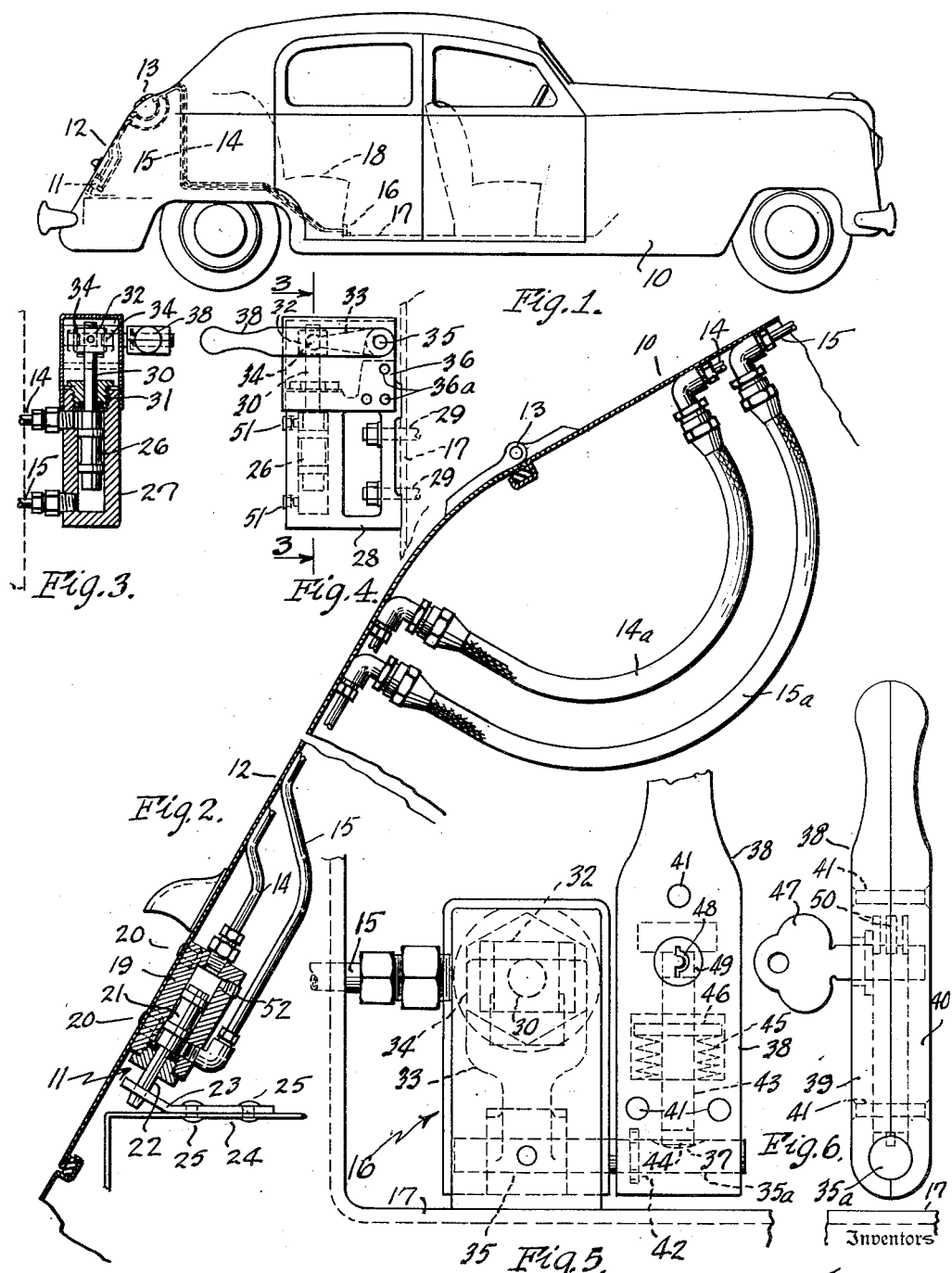

Patented Sept. 14, 1954

2,688,865

UNITED STATES PATENT OFFICE 2,688,865

HAND OPERATED HYDRAULIC LOCK

Roderick J. Foster, Milford, and Henry Morgan Kellogg, Stratford, Conn.

Application April 17, 1951, Serial No. 221,426

5 Claims. (Cl. 70—129)

This invention relates to a hand-operated hydraulic lock, and more particularly to a remote controlled hydraulically operated lock which, although it could be used for locking any closure, is particularly designed and is shown in the drawing as applied to a lock for the trunk compartment of a motor car.

It has for an object to provide an improved lock for any closure which may be operated from any desired location, and, for example, when applied to the door of a trunk compartment may be installed to operate from any part of the car, and a particular object is to provide such a device in which there is no reservoir or other release for the operating liquid, and there is no reliance on a spring for return operation of the locking bolt, but there is positive operation of this bolt in both directions.

With the foregoing and other objects in view, we have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side elevation of a motor car showing this device in dotted lines applied thereto;

Fig. 2 is a section through the trunk compartment closure and associated parts of a car body and the lock-operating cylinder, with associated parts shown in side elevation;

Fig. 3 is a longitudinal section through the control cylinder, substantially on line 3—3 of Fig. 4;

Fig. 4 is a side elevation of the control cylinder and operating handle, but showing the device turned to an angle of 90° from the normal or position of Fig. 5;

Fig. 5 is a front view of the control set-up and operating handle on a larger scale, and Fig. 6 is a side view of the handle looking from the right of Fig. 5

As shown in Fig. 1, the device is indicated as installed in a motor car 10 with the lock indicated at 11 applied to the closure or door 12 of the trunk compartment of the car, hinged at 13. The lock is connected by suitable conduits 14 and 15 with the hand control 16 located at any desired point within the car, but preferably on the floor 17 just in front of the rear seat 18, as in this position it is less apt to be in the way or interfere with ordinary use of the car.

The device comprises a cylinder 19 mounted on the inner side of the trunk compartment door or closure 12 by any suitable means such as rivets 20, and in this cylinder is a double-action piston or plunger 21 connected to the locking pin 22 which, when in the lock position of Fig. 2, passes through an opening in the bracket or keeper 23 securely fastened on the floor 24 of the compartment by any suitable means, such as rivets 25. Pipe conduits 14 and 15 are connected to the cylinder 19 on opposite sides of piston or plunger 21 and lead to the control device 16, which may be located in any desired position in the car, but preferably immediately in front of the rear seat 18 and directly above the floor 17, as shown in Fig. 1. The conduits 14 and 15 lead to the control device and include flexible sections 14a and 15a around the hinge 13 of the compartment door 12 to permit opening of the door by lifting it or swinging it upwardly about the hinges 13 in the usual manner.

The remote control device 16 comprises a piston 26 in a cylinder 27 which is part of block 28 secured to the floor 17 by any suitable means, such as bolts or screws 29, and the pipes or conduits 14 and 15 are connected to this cylinder on opposite sides of the piston 26, as shown in Fig. 3. A stem 30 connected with the piston 26 passes through a suitable gland 31 to a collar 32 secured to this stem, and a forked lever 33 is connected to this collar by the rounded branches 34 of the forked lever seating in suitable channels in the sides of the collar so that operation of the lever will shift the piston 26 back and forth. The lever 33 is mounted on a shaft 35 in the lower part of the block 28, and the shaft and lever are sealed in tight by housing 36 against entrance of dirt and also to prevent tampering with it, so that the door cannot be unlocked unless the operator has a suitable key. For this purpose the housing 36 is riveted to the block as shown at 36a, and the shaft 35 projects from one side of the housing 36, as shown at 35a, and has a keyway 37. Mounted on the extension of this shaft is a hand lever 38 normally free to turn on the extension 35a. This hand lever is preferably made in section 39 and 40 riveted together as indicated at 41, and is locked on the shaft by any suitable means against removal by an unauthorized person, so that it cannot be taken off the shaft to permit operation of the shaft and the lock by a pair of pliers or the like. Such a locking means could be a snap ring 42 seated partly in each of aligned grooves in the shaft and the handle. Mounted in the handle or lever 38 is a sliding bolt 43 provided with a reduced end 44 adapted to seat in the keyway 37 in the shaft extension 35a to lock the hand lever to the shaft for operation of the lock by shifting the piston 26 through the lever 33. A pair of springs 45 mounted in the handle operate against the transverse pin 46 in the bolt 43 and tend to shift the bolt upwardly away from the shaft 35 and remove its reduced end 44 from the keyway 37 so that the lever is free to turn on the shaft and will not operate the lock. The bolt 43 is controlled by a key 47 which is inserted in the horizontal position in a specially shaped slot 48 in a lock cylinder 49, and when turned to the upright position shown in Figs. 5 and 6, the key engages the end of the bolt or bar 43 to shift it down to the position with its reduced end 44 seated in the key way 37 to thus lock the handle to the shaft. Suitable tumblers 50 may be provided cooperating with corresponding notches in an edge of the key to control its operation in the well known manner. Thus, when the key is in the lock and turned to the upright position to shift the bolt 43 downwardly, with the reduced end 44 in the keyway 37, the lever is connected to the shaft 35 so that operation of this lever will operate the shaft and through shifting of the lever 33 will shift the control piston 26 in either direction. As this piston is shifted it forces the fluid positively through the pipes or conduits 14 and 15 to operate piston 21 and thus release or engage the pin 22 from or with the bracket 23. It will be understood the locations of the cylinder 19 and keeper or bracket 23 could be reversed, with the cylinder mounted on the floor of the compartment and the keeper mounted on the door or closure.

A distinctive feature of this device is that there is no reservoir or other release for the operating liquid, and no spring operation for returning either the locked piston 21 or operating piston 26, but there is positive operation of the piston 21 in both directions. That is, if the operating piston 26 is shifted downwardly as viewed in Fig. 3, it will force liquid through the pipe 15 to the under side of the piston 21 to thus shift this piston upwardly, and as it moves up it forces the same amount of the liquid on top of the piston through the pipe 14 to the space at the top of the piston 26, so that there is positive operation, and, of course, reverse or upward operation of the piston 26 will operate in the same way to shift the piston 21 in the opposite direction. In the arrangement shown, shifting the piston 21 downwardly forces the bolt 22 through the opening in the bracket 23 to lock the door or closure 12 in the closed position shown in Fig. 2, and, of course, shifting the piston 21 upwardly will draw the bolt 22 from the bracket 23 and unlock this door or closure.

From the above it will be seen that when the key is out of the lever 38, this lever is free to turn on the shaft and operation of the lever will have no effect on the lock. It will also be seen that there is operating liquid, such, for example, as oil on both sides of the control piston 26, as well as the lock-operating piston 21. There is no overflow, and sliding back and forth of the piston 26 effects a positive operation of the lock piston 21. As there is oil on both sides of the pistons, when the control piston 26 is shifted in one direction to force oil to one side of the lock piston, oil from the other side of the lock piston will be forced out of its cylinder and be returned to the other side of the control piston, and the pistons and parts are so adapted that there is substantially an equal flow from one side of the piston to the other with each movement of the operating means or handle 38.

In normal operation of the car, the operating handle 38 is locked to the shaft 35 so that the lock on the trunk compartment door may be readily either secured or released by operation of the handle 38. However, should it be desired to lock the trunk compartment, as, for example, it is required the car be left unlocked in a parking lot and with the ignition key in it so that it may conveniently be shifted, the owner may merely remove the key 47 from the hand lever and this will release this lever so that it is free to turn on the shaft 35 and will keep the trunk compartment locked even though the car it self is unlocked. locked even though the car itself is unlocked.

To facilitate properly filling the hydraulic system on both sides of the pistons, suitable plugs are provided, as shown at 51, leading to the bore of cylinder 27 on opposite sides of the piston 26, and similar plugs 52 leading to the bore of cylinder 19 on opposite sides of the piston 21 to permit bleeding of and removal of air from the cylinders and connecting pipes to insure that the cylinders and piping are completely filled with the operating oil or liquid.

It is obvious, too, that if it is desired to change the direction of operation of handle 38 it is only necessary to place the locking pin 22 in the retracted position and interchange the pipe connections 14 and 15 of control cylinder 27.

Having thus set forth the nature of our invention, we claim:

1. In a device of the character described, a lock including a double-acting cylinder enclosing a two-way piston, and a movable bolt shiftable to and from a locking position by the piston, a double-acting control cylinder located remote from the first cylinder, a two-way piston in the control cylinder, separate nonconnected and wholly independent conduits connecting the respective cylinders on opposite sides of the pistons and forming the sole connections between the cylinders, an incompressible fluid substantially filling the conduits and fluid passageways of the cylinders throughout forming independent incompressible fluid columns connecting the cylinders whereby movement of the control piston in either direction will cause a corresponding positive operation of the lock piston, and key controlled means for positively operating the control piston in both directions to shift the first piston.

2. In a device of the character described, a lock comprising a double-acting cylinder enclosing a two-way piston, and a bolt shiftable to and from a locking position by said piston, a double-acting control cylinder, a two-way piston in the control cylinder, separate non-connected and wholly independent conduits connecting the respective cylinders on opposite sides of the pistons and forming the sole connections between the cylinders, an incompressible fluid substantially filling the conduits and fluid passageways of the cylinders throughout forming separate independent incompressible fluid columns connecting the cylinders whereby shifting of the control piston in opposite directions will correspondingly and positively shift the lock piston in opposite directions, and key controlled hand operated means for positively operating the control piston in both directions to shift the first piston.

3. In a device of the character described, a lock comprising a double-acting cylinder enclosing a two-way piston, a bolt shiftable to and from a locking position by said piston, a double-acting control cylinder, a two-way piston in the control cylinder, separate non-connected and wholly independent conduits connecting the respective cylinders on opposite sides of the pistons and forming the sole connections between the cylinders, an incompressible fluid substantially filling the conduits and fluid passageways of the cylinders throughout, forming independent incompressible fluid columns connecting the cylinders whereby movement of the control piston in either direction will cause a corresponding positive operation of the lock piston, a shaft connected with the control piston for positively operating it in both directions, a hand lever mounted for free turning movement on the shaft, and key controlled means for locking the lever to the shaft for operating it.

4. In a lock mechanism of the character described, a double-acting cylinder, a double action piston in the cylinder, a movable lock bolt operated by the piston to and from a locking position, a double-acting control cylinder located remote from the first cylinder, a double-acting piston in the control cylinder, separate non-connected and wholly independent conduits connecting the respective cylinders on opposite sides of said pistons and forming the sole connections between the cylinders, an incompressible fluid substantially filling the conduits and fluid passageways of the cylinders throughout forming separate independent incompressible fluid columns connecting the cylinders whereby shifting of the control piston in opposite directions will correspondingly and positively shift the lock piston in opposite directions, and suitable means for positively operating the control piston in both directions.

5. In a lock mechanism of the character described, a double-acting cylinder, a double action piston in the cylinder, a movable lock bolt operated by the piston to and from a locking position, a double-acting control cylinder located remote from the first cylinder, a double-acting piston in the control cylinder, separate non-connected and wholly independent conduits connecting the respective cylinders on opposite sides of said pistons, an incompressible fluid substantially filling the conduits and fluid passageways of the cylinders throughout, forming independent incompressible fluid columns connecting the cylinders whereby movement of the control piston in either direction will cause a corresponding positive operation of the lock piston, a shaft connected with the control piston for positively operating it in both directions, a hand lever mounted on the shaft for free turning movement, and key controlled means for locking the lever to the shaft for operating it.

References Cited in the file of this patent

UNITED STATES PATENTS

| Number | Name | Date |
| --- | --- | --- |
| 971,358 | Clawson | Sept. 27, 1910 |
| 2,111,687 | Webb | Mar. 22, 1938 |
| 2,417,232 | Bohall et al. | Mar. 11, 1947 |
| 2,417,256 | Kremiller | Mar. 11, 1947 |
| 2,510,201 | Summey | June 6, 1950 |
| 2,548,242 | Rosenbarger | Apr. 10, 1951 |